United States Patent [19]
Pollard

[11] Patent Number: 6,034,927
[45] Date of Patent: Mar. 7, 2000

[54] CARRIAGE FOR OPTICAL DISK STORAGE AND RETRIEVAL ARRAY

[75] Inventor: Christopher A. Pollard, Monument, Colo.

[73] Assignees: Sony Corporation, Tokyo, Japan; Sony Electronics, Inc., Park Ridge, N.J.

[21] Appl. No.: 08/326,721

[22] Filed: Oct. 20, 1994

[51] Int. Cl.[7] .................................................. G11B 17/022
[52] U.S. Cl. .......................................... 369/36; 360/98.06
[58] Field of Search ................................ 369/36, 34, 191, 369/192; 360/92, 98.06; 76/89.15, 459

[56] References Cited

U.S. PATENT DOCUMENTS

| | | | |
|---|---|---|---|
| 3,786,454 | 1/1974 | Lissner et al. | 360/98.07 |
| 4,614,474 | 9/1986 | Sudo | 414/231 |
| 4,701,900 | 10/1987 | Hasegawa et al. | 369/36 |
| 4,734,814 | 3/1988 | Fujino et al. | 360/133 |
| 4,755,978 | 7/1988 | Takizawa et al. | 369/37 |
| 4,772,078 | 9/1988 | Nakanishi et al. | 369/39 |
| 4,815,055 | 3/1989 | Fago, Jr. | 369/36 |
| 4,878,137 | 10/1989 | Yamashita et al. | 360/98.05 |
| 4,879,615 | 11/1989 | Teranishi et al. | 369/34 |
| 4,903,140 | 2/1990 | Okamoto et al. | 358/342 |
| 4,982,847 | 1/1991 | Glover et al. | 211/41 |
| 4,998,232 | 3/1991 | Methlie et al. | 369/36 |
| 5,010,536 | 4/1991 | Wanger et al. | 369/36 |
| 5,014,255 | 5/1991 | Wanger et al. | 369/36 |
| 5,025,436 | 6/1991 | Crain et al. | 369/77.2 |
| 5,043,962 | 8/1991 | Wanger et al. | 369/36 |
| 5,043,963 | 8/1991 | Iwamoto | 369/36 |
| 5,056,073 | 10/1991 | Fitzgerald et al. | 369/36 |
| 5,062,093 | 10/1991 | Christie et al. | 369/36 |
| 5,146,451 | 9/1992 | Kang | 369/270 |
| 5,195,078 | 3/1993 | Ikedo et al. | 369/75.2 |
| 5,251,192 | 10/1993 | Liu | 369/36 |
| 5,253,235 | 10/1993 | Isobe et al. | 369/37 |
| 5,377,121 | 12/1994 | Dimitri et al. | 369/36 |
| 5,392,662 | 2/1995 | Jadrich et al. | 74/89.15 |

FOREIGN PATENT DOCUMENTS

| | | |
|---|---|---|
| 0388 056 | 10/1990 | European Pat. Off. . |
| 61-48162 | 3/1986 | Japan ................................. 360/99.06 |
| 61-180959 | 8/1986 | Japan ................................. 360/99.06 |
| 1-217753 | 8/1989 | Japan . |
| 3-192566 | 8/1991 | Japan ................................. 369/178 |
| 2 107 106 | 12/1984 | United Kingdom . |
| 2 232 524 | 12/1990 | United Kingdom . |

OTHER PUBLICATIONS

Product Literature For Prior Art: Todd Enterprises CD ROM Server.
Product Literature for Prior Art: Mreidian Data, Inc. CD ROM Server.

*Primary Examiner*—Jefferson Evans
*Attorney, Agent, or Firm*—Limbach & Limbach LLP

[57] ABSTRACT

A carriage assembly for transporting a sleeve assembly between multiple locations in which the drive motors are spring mounted so as to be self tensioning, the carriage is movably mounted to the worm screw by a two-way flexure which allows for planar movement of the carriage relative to the worm screw yet allows only minimal rotation of the carriage relative to the worm screw, and wherein the sleeve assembly is pivotally mounted to the carriage near the open end of the sleeve. first and second flex plates extending in a first direction perpendicular to the main plate from a first pair of opposing edges of the main plate, respectively,

21 Claims, 14 Drawing Sheets

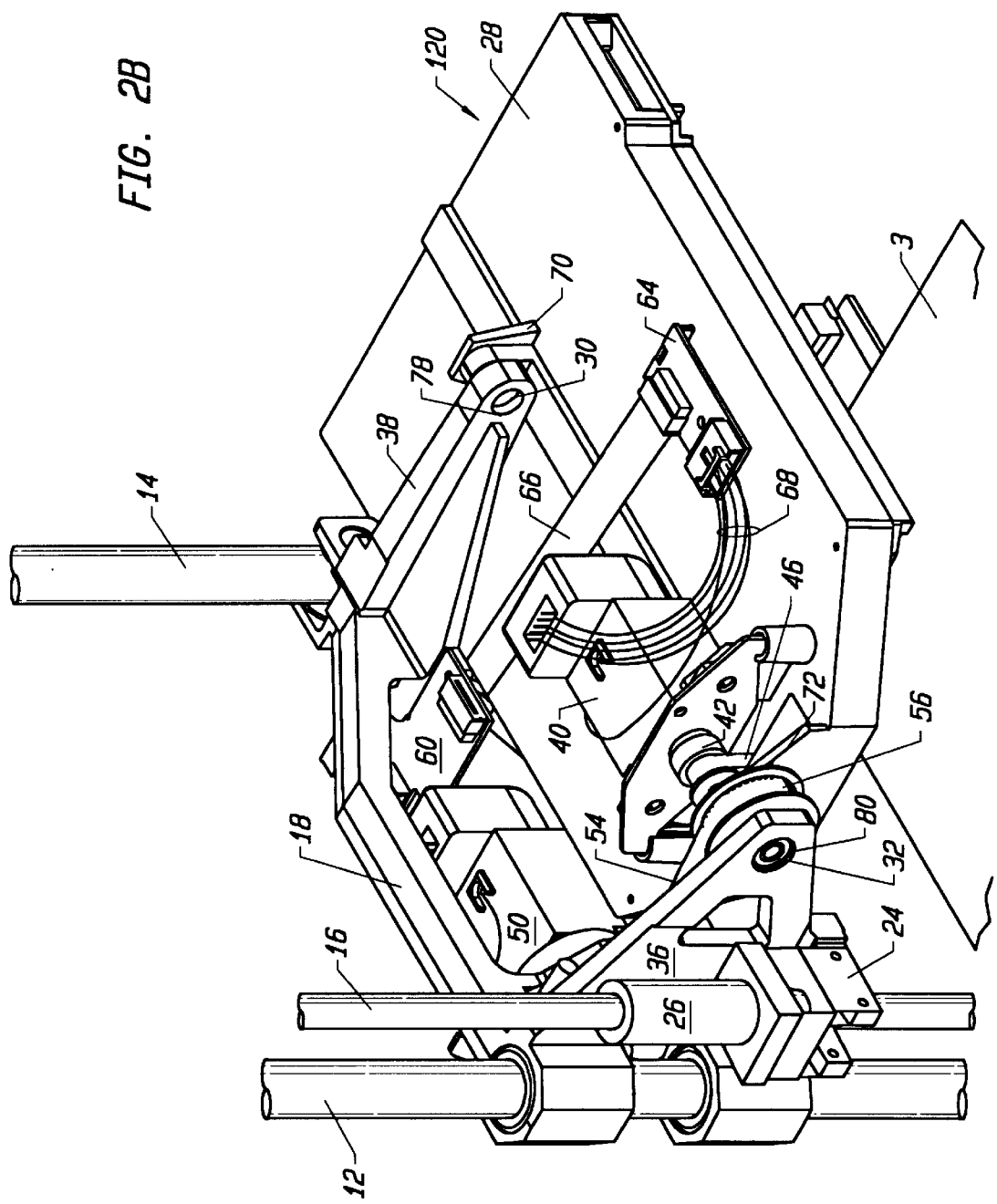

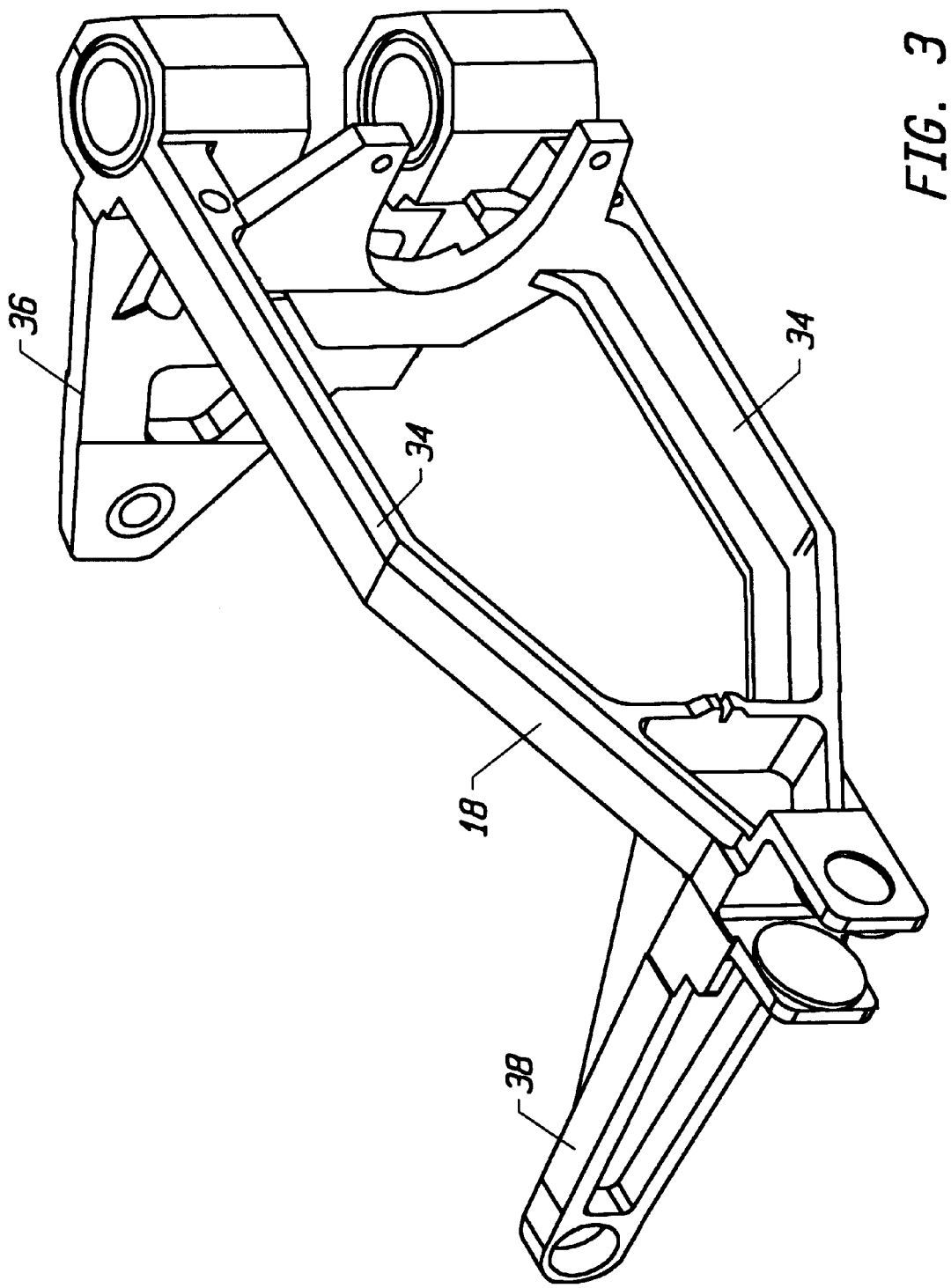

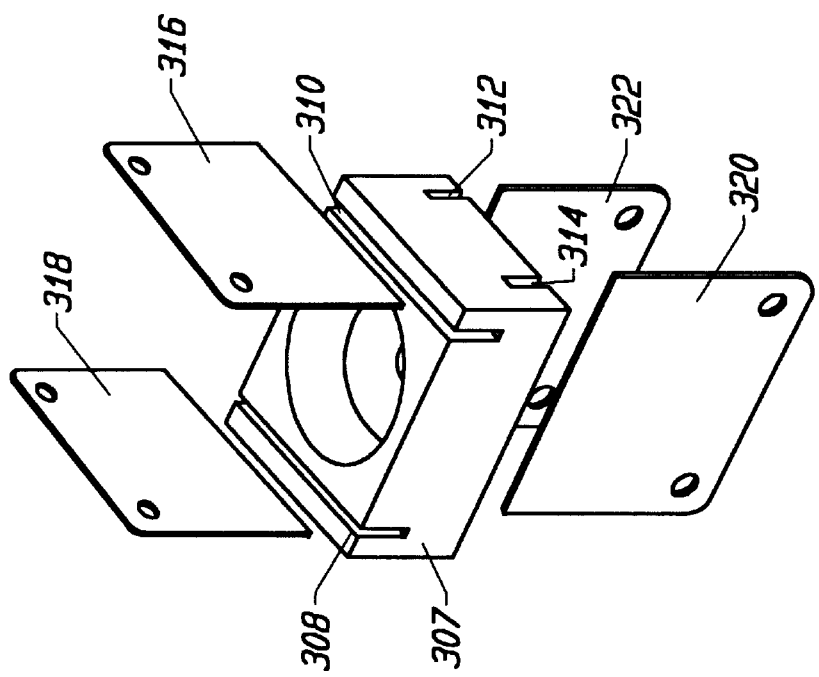
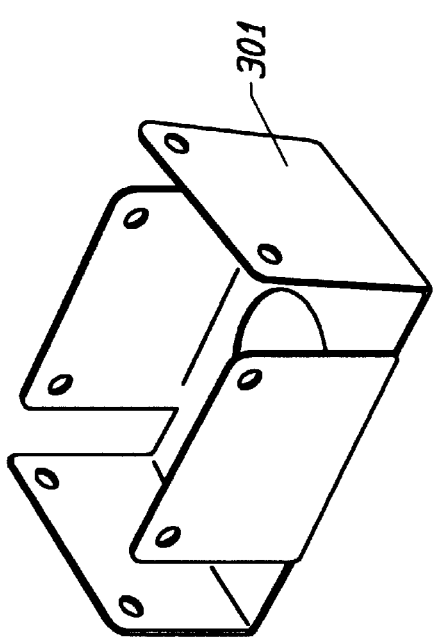
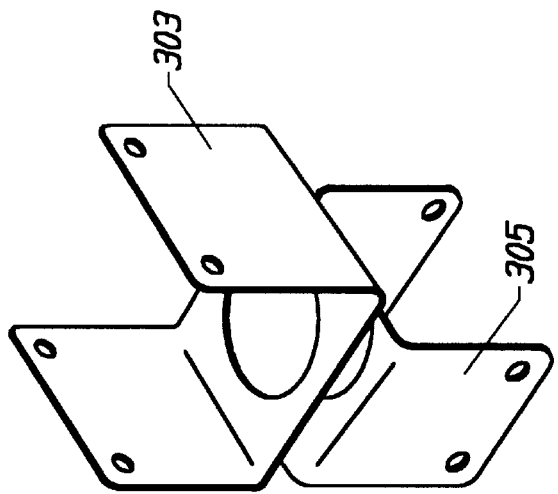

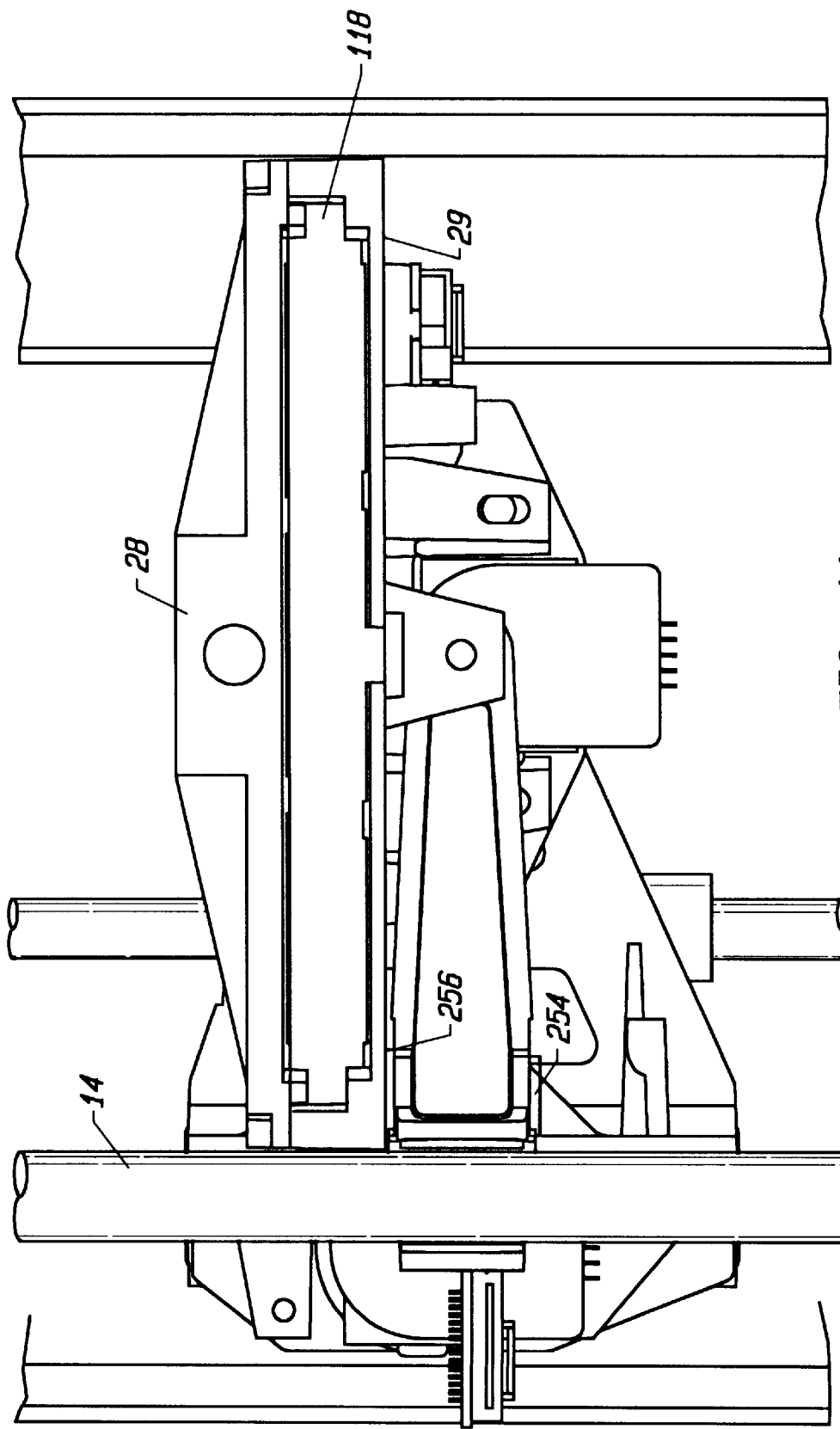

CARRIAGE FOR OPTICAL DISK STORAGE AND RETRIEVAL ARRAY

FIELD OF THE INVENTION

The invention pertains to an apparatus for retrieving a cartridge, such as an optical disk cartridge, from a storage array so that the cartridge may be moved to an alternate location. More particularly, the invention pertains to a carriage mechanism for carrying disk cartridges between alternate locations.

BACKGROUND OF THE INVENTION

Optical disks, magnetic disks and magneto-optical disks are increasingly popular mediums for digitally storing information. Such disks are typically enclosed in a box shaped disk cartridge having apertures through which a laser light source can read (or write to) the disk contained within the cartridge.

In certain large-scale disk cartridge storage and retrieval systems, disk cartridges are stored in one or more racks in an array of storage slots. Commonly, the slots are oriented horizontally and are arranged in a vertical column such that the disk cartridges sit horizontally one on top of another in the individual slots. Storage and retrieval systems may have one or more of such columns of disk cartridge storage slots. This type of system includes a cartridge retrieval mechanism which is movable into position adjacent a slot. The mechanism includes apparatus for grasping a cartridge from the slot, drawing it out from the slot, holding the cartridge in a sleeve, transporting it to a different location, such as a recording/reading/erasing station, and ejecting the cartridge.

Accordingly, the mechanism includes a gripper assembly for grasping and releasing cartridges, a cartridge sleeve assembly for temporarily storing the grasped cartridge, and a carriage assembly for moving the gripper and sleeve assemblies into position adjacent a selected slot so that the gripper can retrieve the disk cartridge and place it in the sleeve. The entire carriage is then moved to another location where the disk cartridge can be ejected from the sleeve assembly into a recording, reproducing, and/or erasing station. In a small disk storage and retrieval system comprising only a single column of slots, the carriage assembly may need to be moveable only in one direction, e.g., vertically. However, in a larger system comprising an array of rows and columns of slots, the carriage assembly would need to be movable in at least two dimensions (horizontally and vertically). In fact, depending on the particular design of the system, the carriage assembly may need to be moveable in all three dimensions (i.e., have three degrees of freedom).

A sleeve assembly commonly comprises a cartridge receiving sleeve which is open at one end and sized to accept a disk cartridge. Within the sleeve is a moveable gripper assembly which can be advanced forward to extend from the sleeve opening into a position where a disk cartridge can be grasped. The gripper assembly is then moved back into the sleeve, pulling the cartridge from its slot into the sleeve.

In order to provide for movement of the gripper for drawing disk cartridges into and ejecting disk cartridges from the sleeve, a gripper drive motor with associated gears and belts is mounted directly on the sleeve assembly. Further, in certain systems, the sleeve assembly itself must be rotatable so the cartridge contained within the sleeve assembly can be rotated. For instance, in certain systems it may be necessary to flip cartridges 180° so that information can be read from or written to either face of the disk contained within the cartridge. In such systems, the sleeve assembly is pivotally mounted on the carriage and the carriage includes a second motor with associated gears and belts for rotating the sleeve assembly relative to the carriage.

The carriage itself is slidably mounted on a vertical shaft and a vertical worm screw. The shaft keeps the carriage in the proper position with respect to the horizontal plane while the worm screw is driven by a third motor to cause the carriage to move vertically along the shaft. If the carrier must be able to move horizontally also, the support shaft and worm screw may themselves be mounted on an additional carriage which is horizontally movable. This second carriage may be similar in design to the first carriage described above except that it would be supported on a horizontal, rather than vertical, support shaft and worm screw.

During assembly of such carriages, the various motors must be precisely mounted relative to the belt drive gears so as to provide the proper tension on the belts. This typically has been done by loosely mounting the motor in its support member with the belt engaged between the motor and the remote gear or gears and coupling the motor to a force measuring device. The motor is then moved until the force measuring device shows the proper tension on the belt, at which point the screws are tightened to permanently fix the motor in position. This method has proved to be labor intensive and also to require frequent adjustment in the field.

Another frequently encountered problem in these types of carriages relates to the fact that, if the shaft and the worm screw are not exactly parallel, significant stresses can be applied to the carriage, shaft, and/or screw leading to premature wear and failure.

Another common problem with these types of carriages is that, after a period of use, components may fatigue or otherwise be bent so that parts may not align properly. Thus, when the various carriages and components are moved and rotated so as to place the aperture of the sleeve assembly in front of a particular slot, the aperture actually may not be precisely aligned with the slot. This may lead to premature failure of the system.

Accordingly, it is an object of the present invention to provide an improved carriage mechanism for a disk storage and retrieval apparatus.

It is a further object of the present invention to provide a self tensioning motor mount for a carriage system of a disk storage and retrieval apparatus.

It is yet another object of the present invention to provide a flexible mounting apparatus for coupling a carriage mechanism to a worm screw to allow for relative planar movement between the carriage and the worm screw with minimal relative rotational movement.

It is a further object of the present invention to provide a carriage for a sleeve assembly having superior positional stability.

SUMMARY OF THE INVENTION

The invention comprises a carriage assembly which is light weight, easy to assemble and inexpensive to manufacture due to its low number of parts. Also, it is long lasting and reliable.

Motors with belt drives which must be mounted to the carriage are mounted to a plate having flanges which are designed and positioned to mate with holes or tubes in the carriage. Coil springs are positioned with one end in the associated hole or tube and the other end surrounding the flange. The springs are oriented to provide a force between the motor and the non-motor-mounted gears which will pretension the associated belt. The spring constant and the length of the springs are selected such that, when the motor is positioned with the associated belt engaging all gears to which it is to be engaged, the springs provide a force which tensions the belt to the desired tension. The motor can then be fastened to the carriage without the need for external measurement of belt tension.

In another aspect of the invention, the carriage is connected to its associated worm screw by a two way flexure which allows planar movement of the carriage relative to the worm screw perpendicular to the axis of the worm screw while allowing minimal rotation of the carriage relative to the axis of the worm screw.

In yet another aspect of the invention, the sleeve assembly is pivotally mounted to the carriage at two points, one of the points being near the open end of the sleeve in order to minimize rotation of the carrier relative to the carriage other than parallel to the desired rotational axis.

In one further aspect of the invention, the sleeve assembly is rotatable on the carriage assembly between first and second use positions. Bump stops are placed on the carriage so that the sleeve assembly contacts the first and second bump stops when in the first and second use positions, respectively. A motor for rotating the sleeve assembly between the first and second use positions is controlled to rapidly rotate the sleeve assembly through most of the arc between the first and second use positions. Only as the sleeve assembly approaches the desired use position is it slowed down such that it contacts the bump stop gently. Even after the sleeve assembly is in the desired use position, a bias current is maintained on the motor to maintain a force biasing the sleeve assembly into contact with the bump stop.

BRIEF DESCRIPTION OF THE DRAWINGS

FIGS. 2A, 2B and 2C are more detailed perspective views of the carriage assembly of FIG. 1.

FIG. 3 is a perspective view of the main body of the carriage assembly of FIG. 2.

FIGS. 6B, 6C and 6D are perspective views of alternate embodiments of a flexure which can be used in the present invention.

FIGS. 10 and 11 are simplified perspective views of the carriage assembly of FIG. 2 showing the sleeve assembly in first and second use positions, respectively.

DETAILED DESCRIPTION OF A PREFERRED EMBODIMENT OF THE INVENTION

Figure 1:
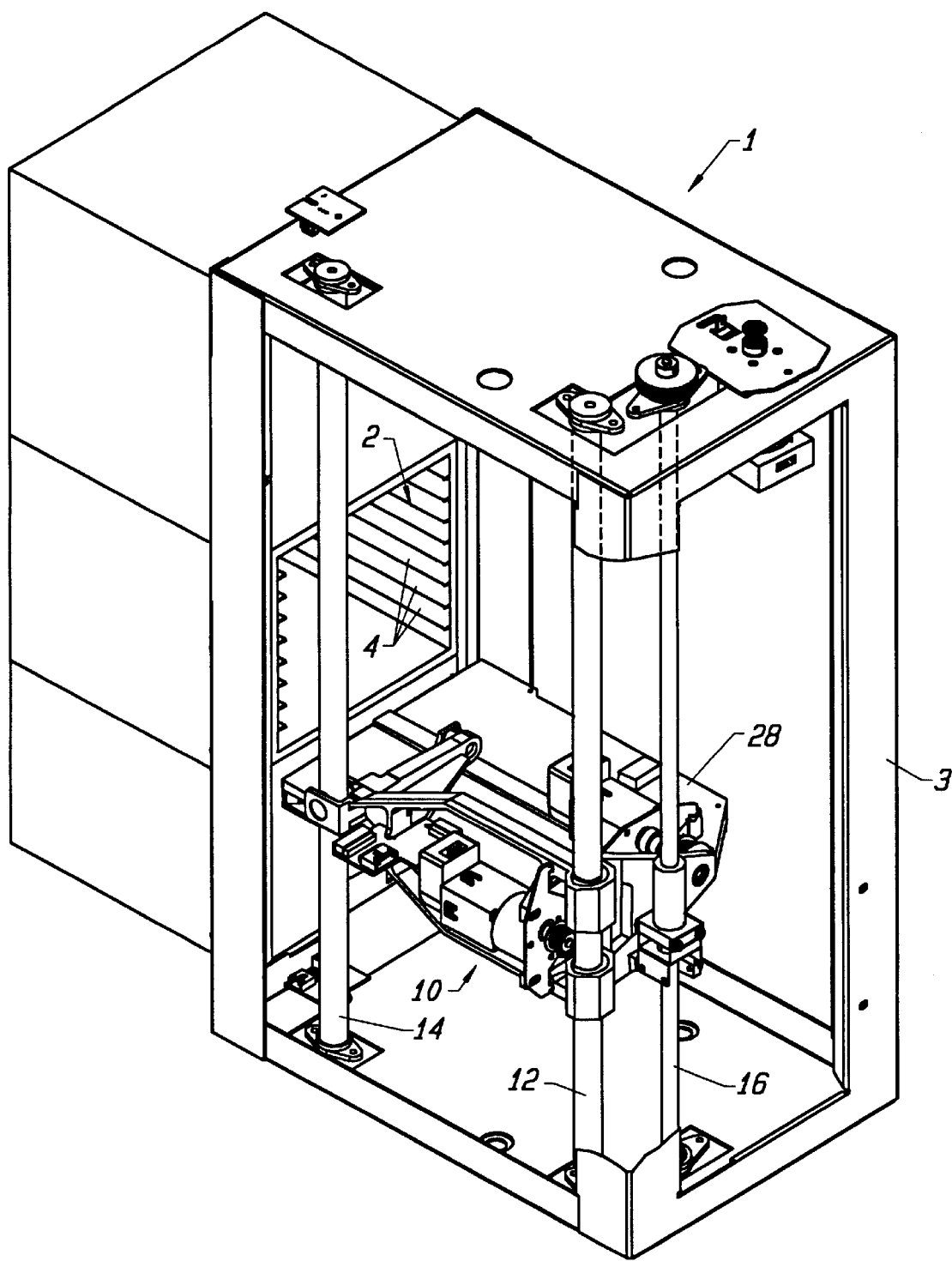
FIG. 1 is a perspective view generally illustrating a disk storage and retrieval apparatus in accordance with an embodiment of the present invention.

FIG. 1 is a perspective view generally illustrating the main components of a disk storage and retrieval apparatus.

As shown, the apparatus comprises an array 2 of disk cartridge storage slots 4. Although not shown in FIG. 1 in order not to obscure the slots, each slot would normally have a disk cartridge positioned therein. The carriage assembly 10 which includes a sleeve assembly 28 and a gripper assembly (not visible in FIG. 1) is supported on primary and secondary shafts 12 and 14 and is raised and lowered by rotation of a worm screw 16. The carriage assembly is moveable along the shafts 12 and 14 by worm screw 16 to position the sleeve assembly 28 vertically in front of a selected one of the slots 4. As will described in greater detail herein, when so positioned, a pair of grippers on the gripper assembly can extend out of the sleeve assembly, grasp a disk cartridge and draw it into the sleeve assembly. The carriage is then moved to another location, such as a recording, reproducing, and/or erasing station (not visible in FIG. 1) where the grippers are once again extended out of the sleeve assembly in order to insert the selected disk cartridge into the recording, reproducing, and/or erasing station.

Figure 2A:
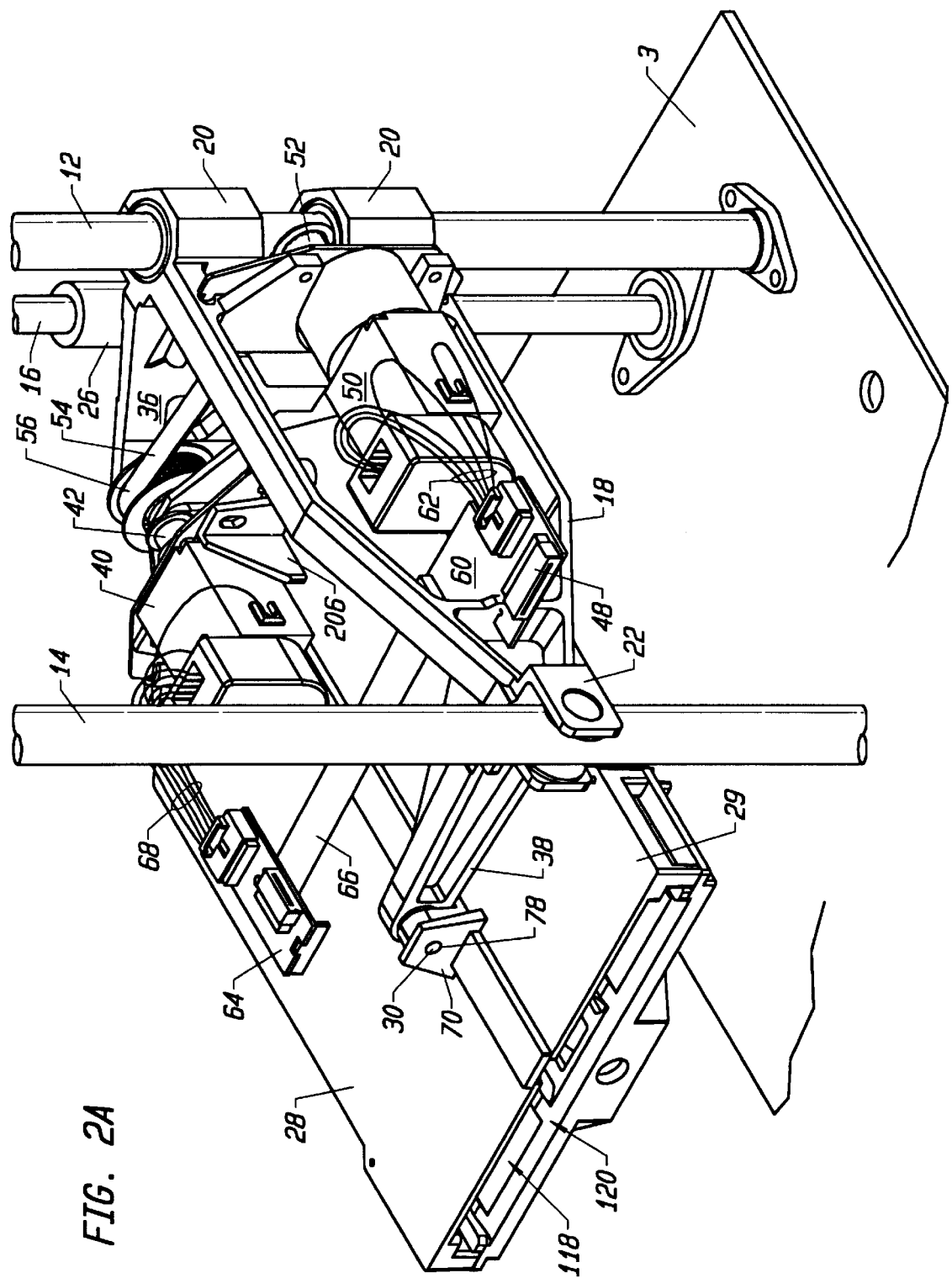
Figure 2C:
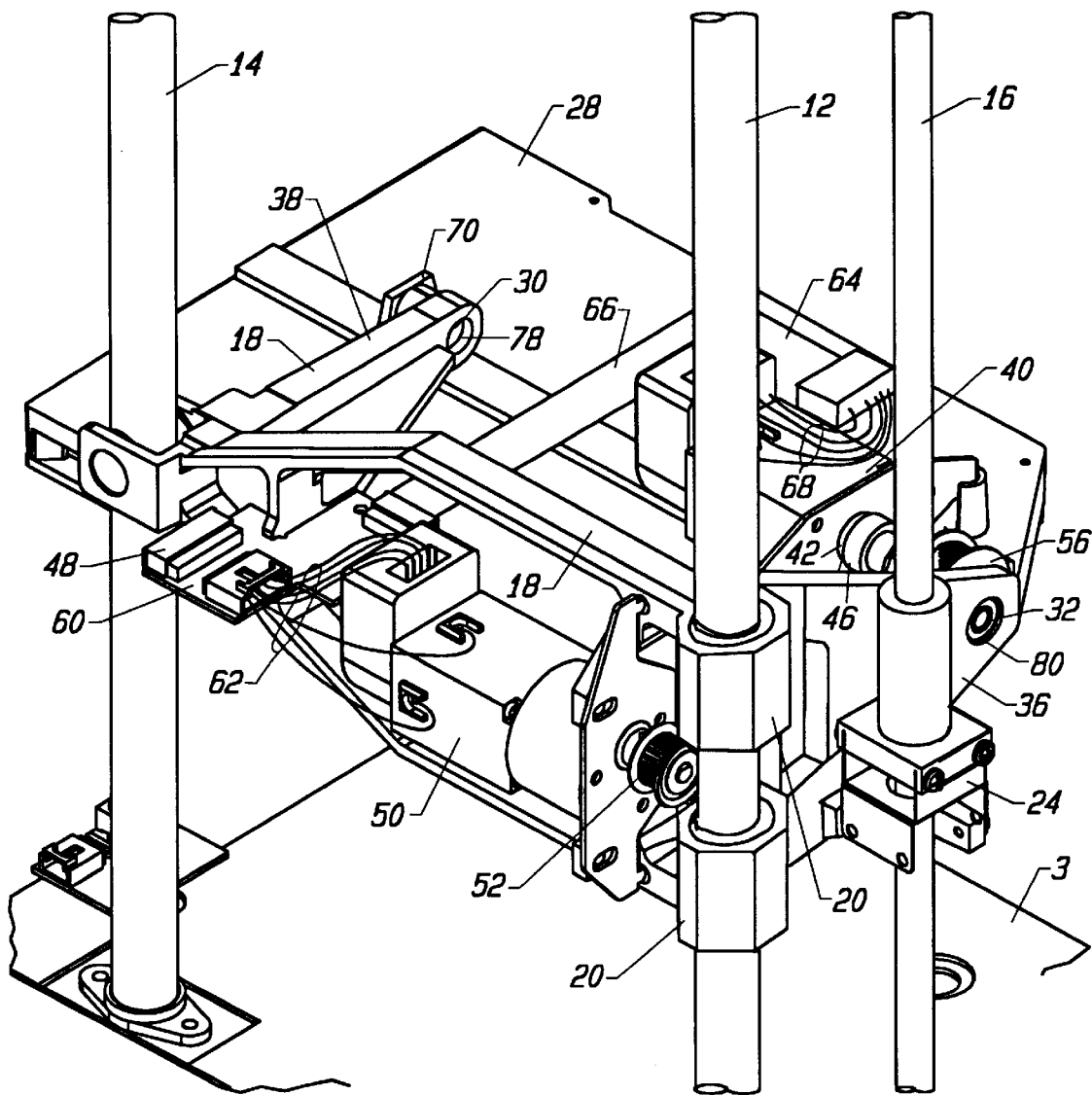

FIGS. 2A, 2B and 2C are perspective views of a particular embodiment of the carriage assembly of the present invention from three different vantage points. The carriage assembly 10 is slidably coupled to the main vertical shaft 12, a secondary vertical shaft 14, and vertical worm screw 16. The main body of the carriage assembly 10 comprises a monolithic main body 18 (See FIG. 3 also) upon which various other components are mounted, as discussed further herein. The main body 18 is slidably engaged with the primary vertical shaft 12 through a pair of ball bushings 20. The main body 18 is coupled to the secondary vertical shaft 14 through a secondary bushing 22. The secondary bushing 22 comprises three walls 22a, 22b and 22c and is open on one side. The engagement of the secondary bushing with the secondary vertical shaft prevents rotation of the carriage assembly 10 around the axis of the primary vertical shaft 12.

The main body 18 is coupled to a vertical worm screw 16 through a flexure 24 and a nut assembly 26. The nut assembly 26 is internally threaded to mate with the threading of the worm screw 16. The worm screw is coupled to a motor (not shown) which, when activated, causes the worm screw to rotate. The worm screw is substantially immovable in the vertical direction. Accordingly, rotation of the worm screw causes the nut assembly (and thus the entire carriage) to move up or down, depending upon the direction of rotation.

In a cartridge storage and retrieval system having multiple columns of disk cartridge storage slots, the primary and secondary vertical shafts 12 and 14 and the vertical worm screw 16 would themselves be mounted on another carriage which is movable horizontally to provide a second degree of freedom for the gripper and sleeve assemblies. However, in order not to obfuscate the description of the invention, the figures illustrate an embodiment of the invention in which the vertical shafts 12 and 14 and worm screw 16 are fixed to the body 3 of the disk storage and retrieval apparatus.

Figure 4:
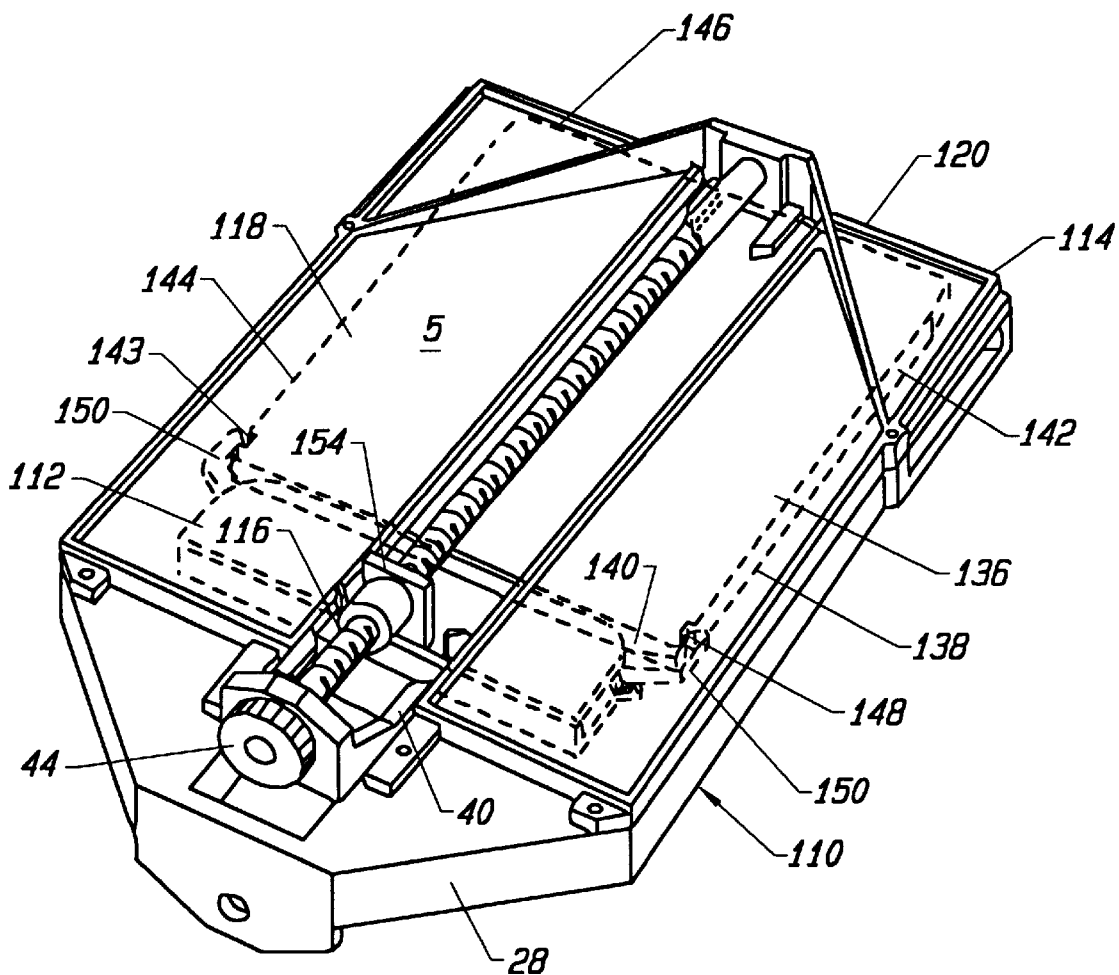
FIG. 4 is a more detailed perspective view of the sleeve and gripper assemblies of FIG. 2.

With reference now to FIG. 4, sleeve assembly 28 includes a base 110, a gripper assembly 112 (shown in outline) within the sleeve assembly, a top plate 114, and a horizontal worm screw assembly 116 for advancing and withdrawing the gripper assembly 112 longitudinally along the base 110. The top plate 114 and base 110 are joined to form a cartridge-receiving sleeve 118 having a space between the top plate and base of sufficient size and shape to hold a cartridge 4, shown in outline. The distal end of the sleeve 118 containing aperture 120, and the apparatus is configured to be positioned with the aperture 120 of the sleeve 118 facing the array 2 of cartridges. As is well-known, each cartridge in the array is comprised of two parallel rectangular faces 136 and 138 which correspond to the top and bottom of the disk, four thin rectangular faces 140, 142, 144 and 146 which surround the disk, and a pair of notches 148 formed near the proximal end of opposing rectangular faces 142 and 144. The gripper assembly is coupled to the worm screw assembly 116 by a nut assembly 154. Rotation of the worm screw about its axis causes the gripper assembly 112 to advance forward towards the open end 120 of the sleeve 118 or retract back into the sleeve 118, depending upon the direction of rotation. In use, when the sleeve assembly 28 is positioned in front of an appropriate slot, worm screw assembly 116 is rotated to advance the gripper assembly towards and out of aperture 120 where the grippers 150 can engage the notches 148 of the cartridge in the selected slot. At this point, the worm screw is rotated in the opposite direction causing the gripper assembly 112 to draw back into the sleeve 118 drawing the selected cartridge out of the selected slot and bringing it into the sleeve 118.

The carriage assembly 10 is then moved to another location, for instance, a recording/reproducing/erasing station, where the gripper assembly 112 can be advanced out of the sleeve 118 so that the cartridge is ejected out of the sleeve assembly and into the station. The detailed operation of the gripper assembly 112 for grasping and releasing the notches 148 of a disk cartridge is not described in detail herein as it is not germane to the present invention and such gripper assemblies are known in the art.

A more detaled description of an exemplary gripper assembly can be found in U.S. patent application Ser. No. 08/183,688 filed Jan. 18, 1994. More detailed descriptions of other components of an exemplary disk storage and retrieval system can be found in U.S. patent application Ser. No. 08/090,744 filed Jul. 13, 1993 and U.S. patent application Ser. No. 08/102,858 filed Aug. 6, 1993.

In order to rotate the worm screw 116 to advance and retract the gripper assembly 112, a motor 40 is mounted to the underside of the sleeve assembly 28. The motor includes a pulley, which, in the preferred embodiment, is a toothed gear 42. Another gear 44 (seen in FIG. 4) is fixedly coupled to one end of the horizontal worm screw assembly 116. Gears 42 and 44 are connected by a toothed belt 46. Rotation of the gear 42 by the motor 40 imparts a rotation to gear 44, and thus the worm screw, through belt 46.

In a preferred embodiment of the invention, the sleeve assembly 28 is rotatable 180° about the line defined by pivot rods 30 and 32. The main body 18 comprises a main horizontal portion 34 and two outwardly extending members 36 and 38. The sleeve assembly 28 includes flanges 70 and 72 extending below the bottom surface 29 of the carrier. Pivot rods 30 and 32 extend horizontally through and are fixed to flanges 70 and 72, respectively. The rods extend beyond the respective flanges to fit within bushing 78 and 80, respectively, disposed in main body 18. The rods 30 and 32 are rotatable within the bushings 78 and 80, respectively. The pivot rods 30 and 32 are co-linear and define the line about which the sleeve assembly 28 is rotatable relative to the main body 18. By providing multiple spaced pivot rods, the sleeve assembly 28 is very rigidly supported on the carriage assembly 10.

It is particularly important that the opening 120 at the front end of the sleeve 118 be precisely positioned for receiving a cartridge. Thus, it is desirable to support the sleeve assembly close to the opening 120. Accordingly, front pivot rod 30 should be positioned as close to the opening 120 as possible. Further, the use of two pivot rods spaced distantly from each other increases the resistance of the sleeve assembly to rotation relative to the main body upon which it is mounted in all directions other than the desired direction of rotation about the pivot rods 30 and 32.

A second motor, gear and belt combination is mounted to the carriage assembly to drive the rotation of the sleeve assembly. This assembly includes motor 50, gear 52, belt 54 and gear 56. Gear 56 is fixedly coupled to the pivot rod 32. Accordingly, rotation of gear 52 by motor 50 cause gear 56 and pivot rod 32, and therefore, sleeve assembly 28, to rotate about the line defined by rods 30 and 32.

Power and control signals for operating motors 40 and 50 come from off-carriage through a flex connector (not shown) which is mated to flex connector receptacle 48 on printed circuit board 60, which is fixed to the main body 18. Circuitry on board 60 conditions the signals and provides power and control signals to motor 50 through wires 62. A second printed circuit board 64 is fixed to the underside of sleeve assembly 28. PC board 64 receives power and signals from the off-carriage flex connector through PC board 60 and second flex connector 66. Circuitry on PC board 64 conditions the signals and provides power and control signals to motor 40 through wires 68 coupled between second printed circuit board 64 and motor 40.

Figure 5:
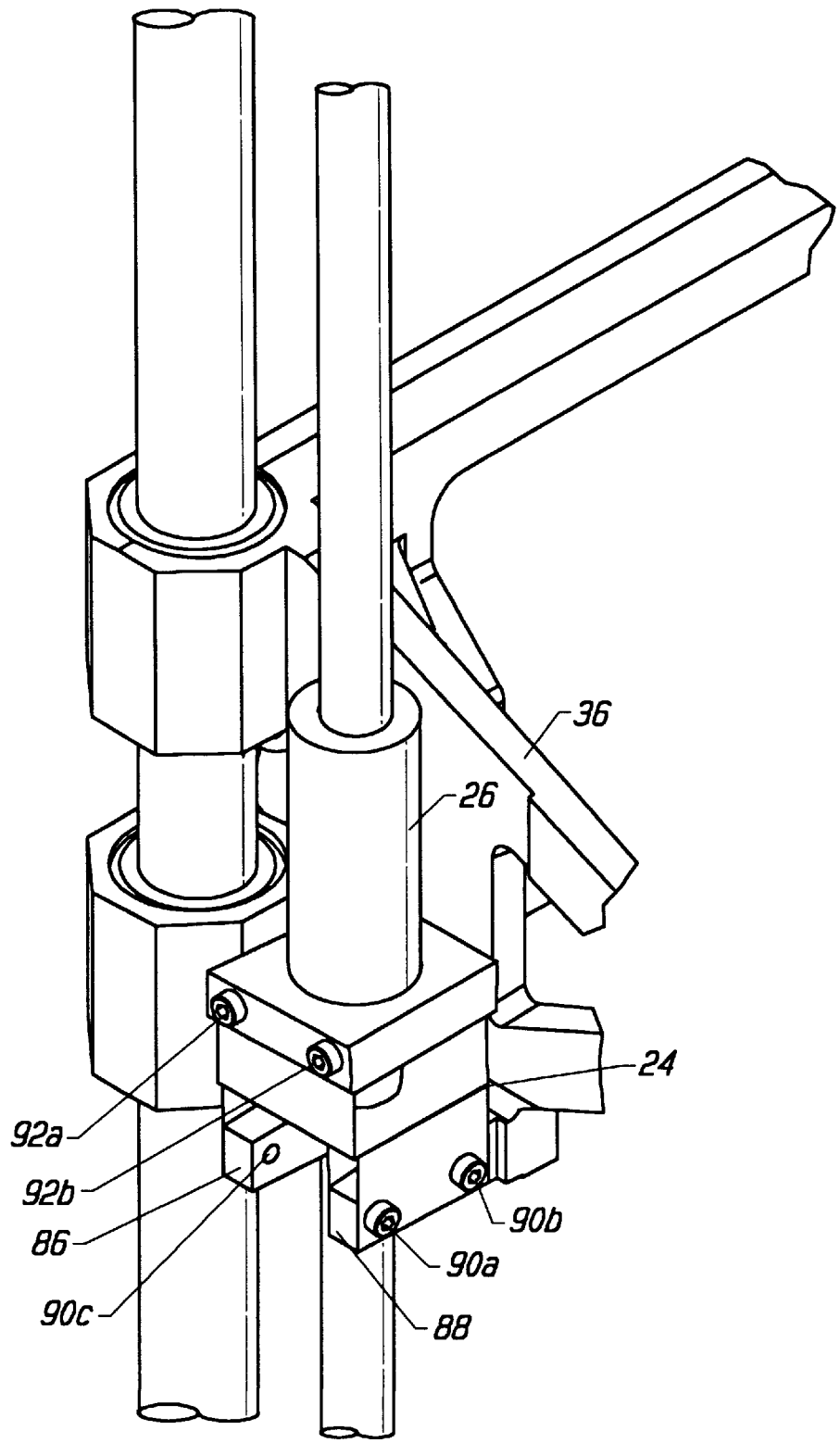
FIG. 5 is a close-up view of the flexure and nut assembly of the carriage of FIG. 2.

FIG. 5 is a more detailed perspective view of the portion of the carriage assembly 10 where it is coupled to the worm screw 16. Two side flanges 86 and 88 extend transversely from outwardly extending member 36 of body 18. A two-way flexure 24 is attached to the two side flanges 86 and 88 by screws 90a, 90b, and 90c. A nut assembly 26 is coupled to the top of the flexure 24 by screws 92a and 92b and two similar screws on the opposite side which are not visible in FIG. 5.

Figure 6A:
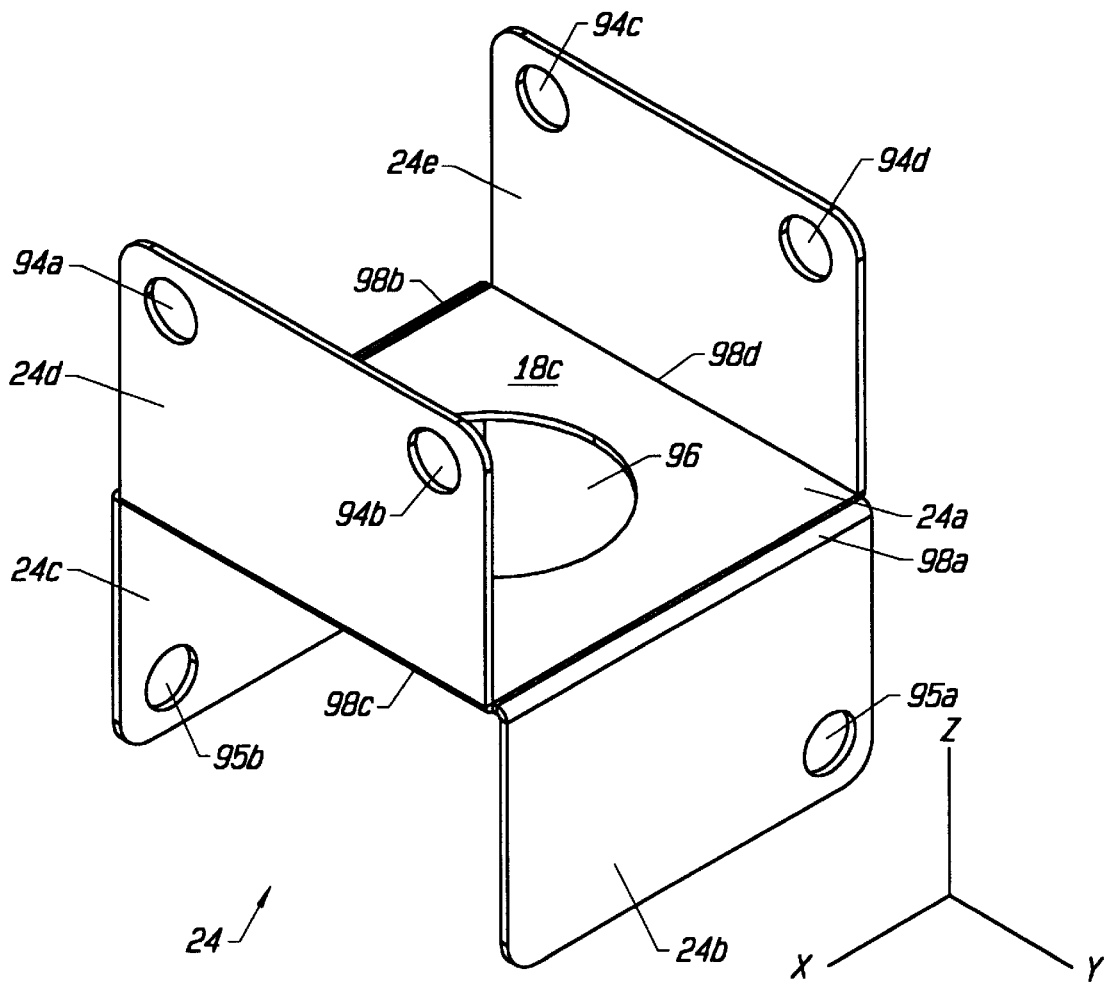
FIG. 6A is a perspective view of the flexure shown in FIG. 5.

The flexure 24 is a single-piece metal stamping which is formed into the shape most clearly illustrated in FIG. 6A. The flexure 24 comprises five planar sections 24a, 24b, 24c, 24d, and 24e. Section 24a is a right quadrilateral section from which the remaining planar sections extend in various directions. In particular, sections 24b and 24c are flex plates which extend downwardly perpendicular to the main section 24a from opposing edges 98a and 98b of the main section 24a. Sections 24d and 24e are flex plates extending upwardly from the other two opposing edges 98c and 98d of main section 24a. The holes 93a, 93b, 93c, and 93d accept screws 92a, 92b, etc. Holes 95a, 95b, and a third hole which is not seen in the view of FIG. 6A accept screws 90a, 90b, and 90c. The worm screw 16 passes through large hole 96 in portion 24a of the flexure 24. Hole 96 is designed to be large enough so that worm screw 16 does not contact the edge of the hole 96. The worm screw engages the internal threading of the nut assembly 26 as is well known in the art.

The flexure is adapted to allow for variations in the horizontal distance between primary vertical shaft 12 and worm screw 16 which are inherent in the manufacture of the disk cartridge storage and retrieval apparatus. In particular, the flexure 24 is designed to accommodate such a variation by flexing to allow for horizontal movement of the nut assembly 26, which is attached to the top end of the flexure, relative to the main body 18, which is coupled to the bottom end of the flexure 24. The design of the flexure 24 allows for such horizontal movement without a significant accompanying rotational component. Any rotation of the nut assembly 26 around the axis of the worm screw 16 results in error in the positioning (height) of the carriage and is, therefore, undesireable. Thus, the flexure minimizes unwanted side loads on the worm screw which might lead to premature failure, while not allowing the nut assembly to rotate about the axis of the worm screw. Referring to FIG. 6, flexure at edges (or hinges) 98a and 98b allow for horizontal offset in the Y dimension while flexure at hinges 98c and 98d allow for horizontal offset in the X direction. When flexed, there is no first order rotational moment, although there is some rotational component in the second and higher orders.

FIGS. 6B, 6C and 6D show alternate embodiments of the flexure. FIG. 6B shows an embodiment 301 of the flexure in which all of the flex plates extend in the same direction. FIG. 6C shows an embodiment of the flexure which is similar to that of FIG. 6A, except that it is fabricated from two pieces 303 and 305 which are welded together. Finally, FIG. 6D shows an exploded view of another possible embodiment of the flexure. In this embodiment a main rigid body 307 has slots 308, 310, 312 and 314 for accepting flex plates 316. 318, 320 and 322, as shown.

Figure 7:
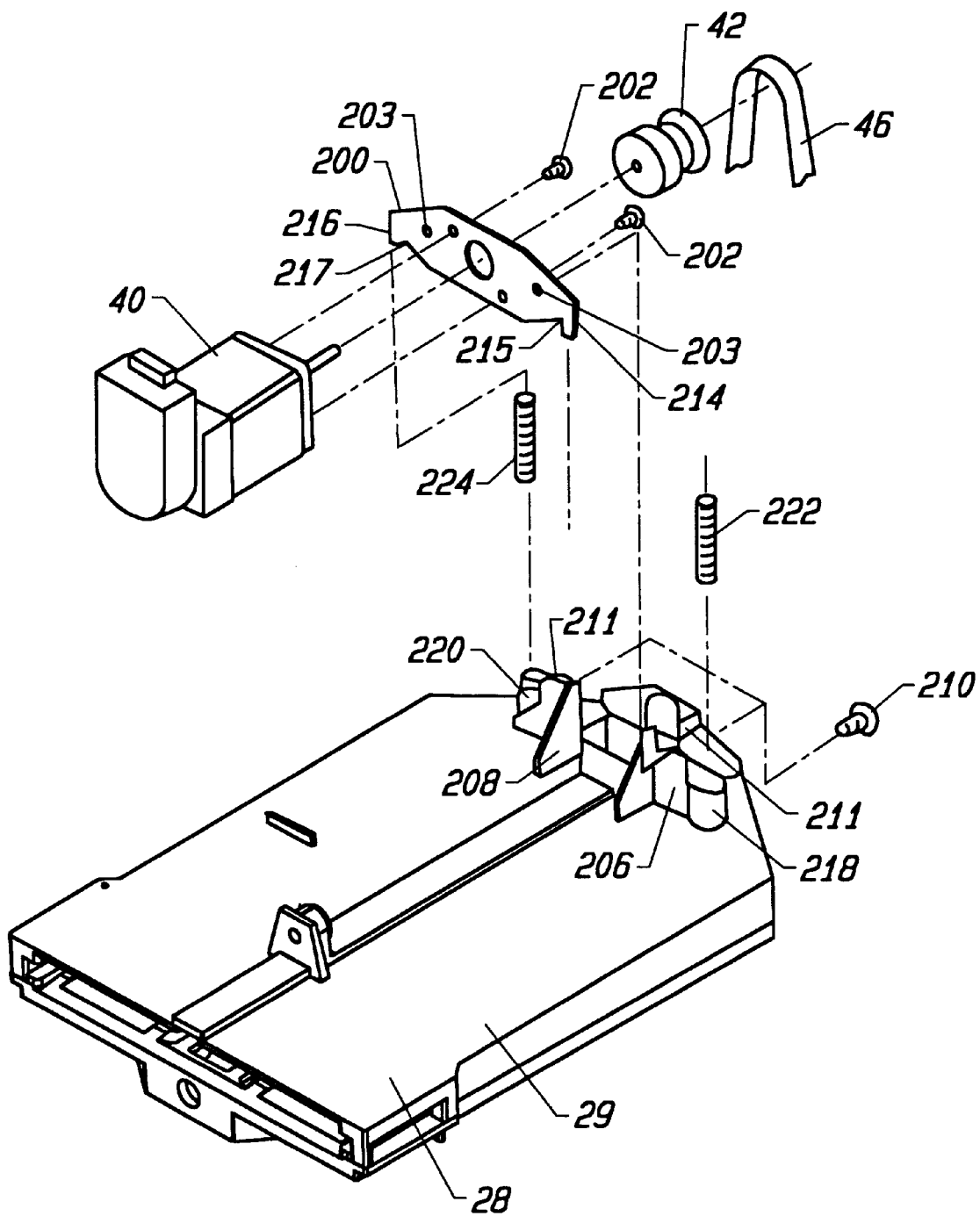
FIG. 7 is an exploded view of the gripper motor drive unit of the carriage assembly of FIG. 2.
Figure 8:
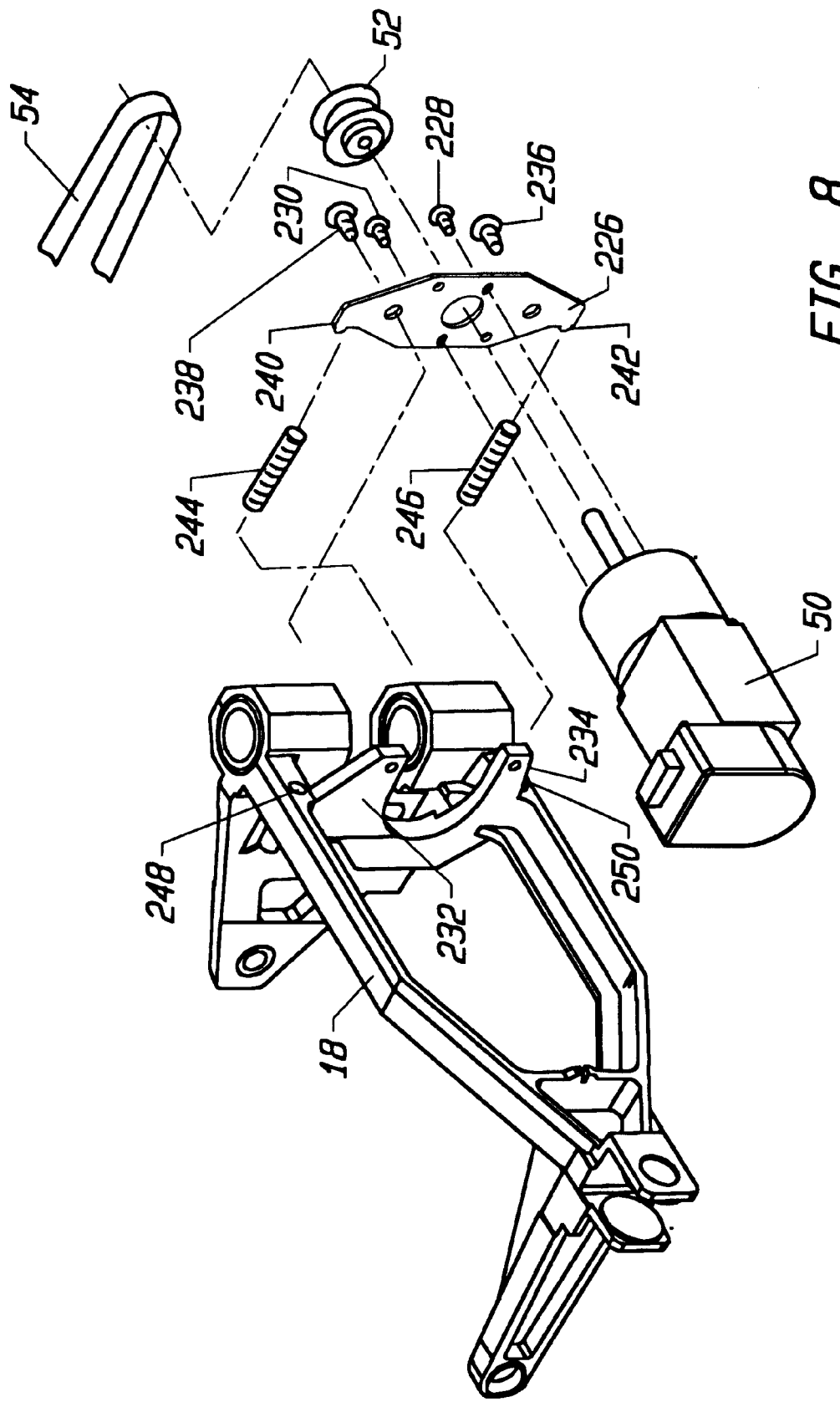
FIG. 8 is an exploded view of the sleeve assembly rotation motor drive unit of the carriage assembly of the FIG. 2.

FIGS. 7 and 8 illustrate another aspect of the present invention relating to the mounting of motors to the carriage assembly. Referring to FIG. 7 first, which illustrate the gripper assembly drive motor 40, the motor 40 is mounted to a steel plate 200 by screws 202 which are inserted through screw holes 203 in the steel plate. The steel plate is then mounted to flanges 206 and 208 extending downwardly from the bottom surface of the sleeve assembly 28 by screws 210 which are inserted through screw holes 211 in the plate 200. The screw holes 211 are oval in shape with the major axis being vertical in the view of FIG. 7. Thus, screw holes 211 are actually vertical slots within which screws 202 can be variably positioned. This allows the motor 40 (and thus the sleeve assembly) to be fixed to the plate 200 at a variable height. Flanges 214 and 216 extending from opposite ends of the plate 200 extend into tubes 218 and 220 which extend from the bottom surface 29 of the carrier 28. Coil springs 222 and 224 are disposed within the tube 218 and 220 and have an internal diameter which is large enough to accept flanges 214 and 216 so that the ends of the springs surround the flanges and rest on the flange shoulders 215 and 217. When the carriage assembly 10 is assembled, screws 210, which mount the steel plate 200 to the carriage are not fully tightened. The motor is moved into position with the belt 46 in place engaging the motor gear 42 and gripper screw gear 44 (not shown in FIG. 7). The springs exert a force on the motor opposite to the force exerted on the motor by the tension of the belt 46 tending to force the motor away from the gear 44. The motor will therefore rest at a position where the opposing forces of the springs and the belt tension are equal. The length, l, and spring constant, k, of the springs 222 and 224 are selected to pretension the belt 46 to a predetermined desired tension. The screws 210 are then tightened to the plate within slotted screw holes 211 to fix the motor 40 and motor gear 42 in place relative to the gripper screw gear 44 in this position in which the belt is tensioned to the predetermined desired level. In this manner, no measurements or adjustments are necessary during assembly of the apparatus or in the field to set the proper belt tension.

Preferably, the springs are substantially longer than the distance between the base of the tubes 218 and 220 and the shoulders of the flanges 214 and 216 when the motor is properly positioned, such that the springs are substantially compressed when proper tension is achieved. Substantial compression of the springs is desirable to minimize the variation of spring force over the range of possible proper motor position. The tolerance range of proper motor position is dictated by the tolerance range of the belt 46 to achieve the desired belt tension (which is a function of both belt length and elasticity).

Particularly, the force applied by a coil spring is given by the equation:

$$\text{force} = kx$$

where k=the spring constant of the particular spring, and x=the distance to which the spring is compressed from equilibrium, i.e., spring length at equilibrium minus spring length under compression.

Thus, the greater the compression of the spring (i.e., the greater the value of x), the smaller the percentage change in the force for a given variation in x, $\Delta x$. For instance, the ideal desired belt tension may be 13 Newtons of force (N). The spring can provide exactly 13 N of force only at single compression length and not over the entire range of possible proper motor position to achieve that force. However, by highly compressing the springs the variation in the force provided by the springs over the range of possible proper motor position from 13 N is minimized. For example, if the compression, x, of a 15 mm spring having a spring constant of 13 N/mm can range from 1 mm to 2 mm over the tolerance range of the belt, spring force can vary 100% from the desired 13 N, i.e., from 1 mm×13 N/mm=13 N to 2 mm×13 N/mm=26 N. However, if a 26 mm spring with a spring constant of 1.0 N/mm is highly compressed such that the 1 mm range in motor position means that the spring compression, x, can vary from 12 mm to 13 mm, the percentage change in force is much smaller, i.e. 13 mm×1.0 N/mm=13 N versus 14 mm×1.0 N/mm=14 N which is only a 7.7% range.

Although basically the same result can be achieved using a single spring at one end of the plate, e.g., flange 216, and pivotably mounting the other end of the plate (near flange 218) to the sleeve assembly 28, it is preferably to include two springs. If so mounted, then, for the same range of possible proper motor position, the range of spring compression would be twice as much since the end of the plate near flange 216 would have to move twice as far to achieve a certain increase in the distance between gears 42 and 44. For the same reasons discussed above with respect to highly compressing the springs when the motor is properly positioned, it is desirable to minimize the range of compression, x, of the springs in order to reduce the force range of the spring over the range of possible proper motor positions. In a preferred embodiment of the invention, two springs are mounted to the plate 200 on opposite sides of the gear 42. Even more preferably, the springs are equidistant from the gear 42.

The sleeve assembly rotation motor 50 is mounted in a similar fashion. In particular, referring to FIG. 8, motor 50 is mounted to a steel plate 226 by screws 228 and 230. That plate is mounted to flanges 232 and 234 of the main body 18 by screws 236 and 238. Flanges 240 and 242 extend from the plate and are designed to engage the first ends of springs 244 and 246. The second ends of springs 244 and 246 are inserted in bore hole 248 and 250 in main body 18. The plate is mounted to the main body in the same manner previously described with respect to motor 40 and FIG. 7.

Figure 9:
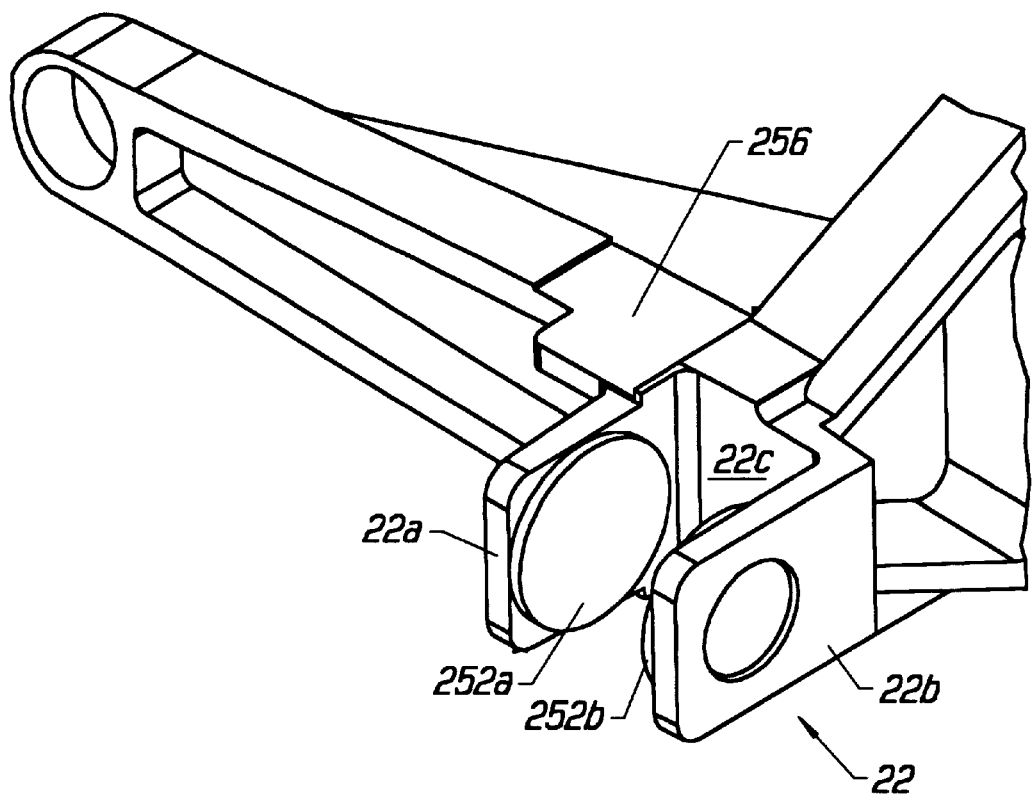
FIG. 9 is a detailed perspective view of the portion of the carriage assembly shown in FIG. 2 adjacent the secondary bushing.

FIG. 9 illustrates further features of the present invention. In particular, FIG. 9 is a close-up detailed view of the portion of carriage assembly 10 adjacent secondary bushing 22. The inner surfaces of walls 22a and 22b of secondary bushing 22 bear circular rubber pads 252a and 252b, respectively. As previously noted, the secondary shaft 14 and secondary bushing 22 are provided to prevent rotation of the carriage assembly 10 around the axis of primary shaft 12. Pads 252a and 252b are made of a low friction material so that the secondary shaft will slide through the bearing with minimal resistance.

Figure 10:
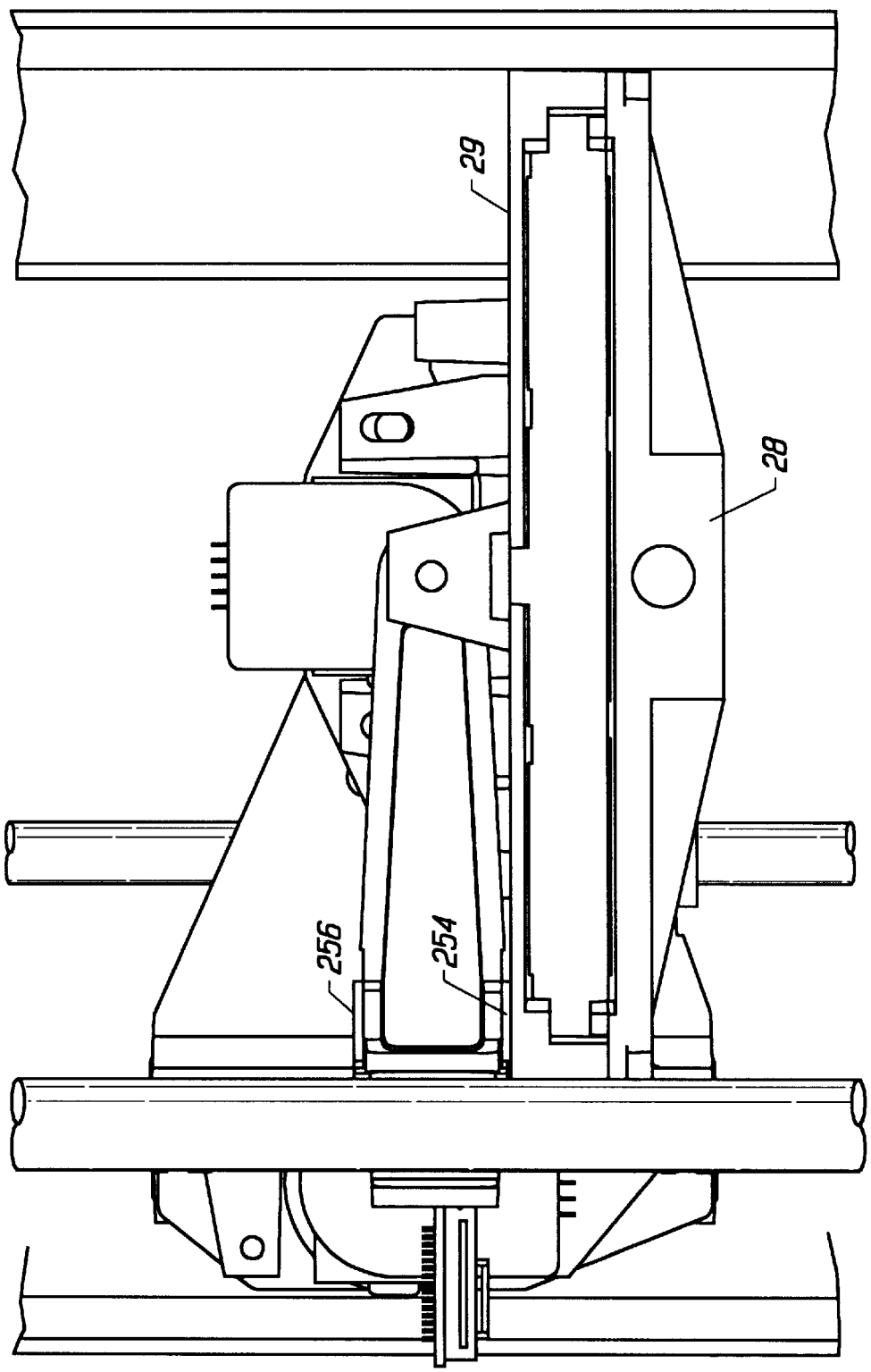

In another aspect of the invention, pads 254 and 256 (FIGS. 9, 10 and 11) are bump stops for the sleeve assembly 28. Specifically, as previously mentioned, the carrier is rotatable 180° about pivot rods 30 and 32 between two use positions, which are illustrated in FIGS. 10 and 11, respectively. The first use position of sleeve assembly 28 is shown in FIG. 10, wherein the bottom surface 29 of the carrier contacts bump stop 256. The second use position is shown in FIG. 11, in which the bottom surface 29 of the carrier 28 engages bump stop 254.

In the preferred embodiment of the invention, signals are applied to the carrier motor 50 so as to quickly rotate the carrier over most of the 180 ° arc between the two use positions to switch from the first position to the second position or vice versa and is slowed down only near the very end of the arc. In this manner, wear and tear is reduced because the bottom surface of the carriage hits the bump stop at a slow speed, yet the time required to switch between the two use positions is kept small because most of the rotation is accomplished at a high speed. Further, a bias current is left on the carrier rotation motor 50 to assure that the bottom surface of the carrier remains in contact with pad 256 or pad 254. Thus, the rotational orientation of the carrier is precisely controlled by contact with the bump stop pads, thus eliminating the need for precise electronic control of the rotational orientation.

Referring again to FIGS. 2A, 2B, 2C, 10 and 11, the length of flex connector 66 is selected such that it will not contact any structure of the disk storage and retrieval system (except for mating with the receptacles at its ends) over the entire range of motion of the sleeve assembly 28 relative to the rest of the carriage 10. In particular, when the sleeve assembly is in the first use position as shown in FIG. 10, flex conector 66 is relatively straight and is suspended at its ends above the bottom surface 29 of the sleeve assembly. When in the second use position, flex connector 66 is folded as shown in side view in FIG. 11, but does not contact itself. The conector 66 aso makes no contact with itself or any other structure over the entire range of motion between the two use positions. This non-contact feature is desireable since flex connectors will wear and fail prematurely where they contact other things.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

I claim:

1. A disk cartridge storage and retrieval system comprising;
   a carriage for transporting disk cartridges between a plurality of locations,
   a first pulley fixed to the carriage for moving the disk cartridge contained in the carriage to a specified fixed position,
   a motor for driving the first pulley,
   a belt coupling the motor to the first pulley whereby the motor can drive the first pulley to move the disk cartridge, and
   a spring coupled between the motor and the carriage positioned so as to exert a force between the carriage and the motor opposite to a force exerted between the first pulley and the motor by the belt so as to create a predetermined tension on the belt at a time prior to said motor being fixedly mounted to said carriage, and
   means for fixedly mounting the motor to the carriage in a position dictated by the spring force and the belt tension.

2. An apparatus as set forth in claim 1 wherein the means for fixedly mounting comprises at least a first screw fixed to one of the motor and the carriage and a slotted screw hole on the other of the motor and the carriage.

3. An apparatus as set forth in claim 1 further comprising a second pulley mounted on a drive shaft of the motor and wherein the motor is coupled to the belt at the second pulley and wherein the spring comprises at least first and second springs positioned on opposite sides of the second pulley.

4. An apparatus as set forth in claim 3 further comprising a plate coupled between the motor and the springs, the plate having first and second flanges for engaging a first end of the first and second springs, respectively, and the carriage having first and second tubes within which the first and second springs are disposed, respectively.

5. An apparatus as set forth in claim 1 wherein the spring has a length and a spring constant such that the force is within a predetermined range of forces when the motor is positioned within a predetermined range of positions.

6. An apparatus as set forth in claim 5 wherein the spring is positioned such that the spring is substantially compressed when the motor is in the predetermined range of positions.

7. A method for mounting a motor to a carriage in a disk storage and retrieval system, the system including a carriage, a motor, a pulley fixed to the carriage remote from the motor and a belt for coupling the motor to the pulley whereby the motor can drive the pulley, the method comprising the steps of;
   positioning the motor in the vicinity of the pulley,
   coupling the belt between the pulley and the motor,
   providing a spring coupled between the motor and the carriage in a position such that the spring applies a force between the carriage and the motor in a direction opposite to a force applied between the motor and the carriage by the belt, thereby causing the motor to be positioned at a location where the spring force and the belt tension are equal,
   the spring having a length and a spring constant such that the force is within a predetermined range when the motor is within a predetermined range of proper mounting positions, and
   fixing the motor to the carriage.

8. A disk cartridge storage and retrieval system comprising;
   a worm screw extending in a first direction,
   a shaft substantially parallel to the worm screw,
   a carriage slidingly engaged to the shaft by a bushing,
   a nut assembly engaging the worm screw such that rotation of the worm screw drives the nut assembly to travel along the worm screw, and
   a flexure coupled between the nut assembly and the carriage, the flexure providing for planar movement perpendicular to the first direction, but substantially no rotational movement, between the nut assembly and the carriage.

9. An apparatus as set forth in claim 8 wherein the flexure comprises;
   a right quadrilateral planar main section having first and second pairs of parallel opposing edges, first and second parallel flex sections extending in a first direction perpendicular to the main section from the first pair of opposing edges of the main section, respectively, and third and fourth parallel flex sections extending in a second direction perpendicular to the main section and to the first and second flex sections and opposite the first direction from the second pair of opposing edges of the main section, respectively.

10. An apparatus as set forth in claim 9 wherein the main section is perpendicular to the worm screw and comprises an aperture through which the worm screw passes.

11. An apparatus as set forth in claim 9 wherein the first, second, third and fourth flex sections each comprise proximal ends adjacent the main section and distal ends spaced from the main section, and the nut assembly is fixed to the flexure at the distal ends of the first and second flex sections and the flexure is fixed to the carriage at the distal ends of the third and fourth flex sections.

12. A disk cartridge storage and retrieval system as set forth in claim 9 wherein the first, second, third, and fourth flex sections each comprise a quadrilateral planar member.

13. An apparatus as set forth in claim 12 wherein said quadrilateral planar members of said first, second, third, and fourth flex sections are right quadrilateral planar members.

14. An apparatus as set forth in claim 13 wherein each of said first, second, third, and fourth flex sections comprise a proximal end adjacent the main section and a distal end spaced from the main section, and wherein the nut assembly is fixed to the flexure at the distal ends of the first and second flex sections and the flexure is fixed to the carriage at the distal ends of the third and fourth flex sections.

15. An apparatus as set forth in claim 14 wherein the distal end of the first and second flex sections comprises an edge coupled to said main section at, at least, first and second points which are spaced from each other in a direction perpendicular to the first direction and at a distance from each other which is substantially greater than the maximum perpendicular displacement possible between the nut assembly and the carriage.

16. A disk cartridge storage and retrieval system comprising;

a plurality of disk cartridges in storage locations, a sleeve assembly for temporarily storing one of the disk cartridges for transportation, the sleeve assembly comprising a sleeve adapted to store a disk cartridge, the sleeve including a front end having an aperture for receiving a disk cartridge and a back end opposite the front end, and a carriage for precisely positioning the sleeve with the aperture adjacent a storage location so that a disk cartridge can be drawn from the storage location into the sleeve through the aperture and for transporting the sleeve between a plurality of locations, the sleeve being rotatably mounted to the carriage at first and second mounting locations, the first mounting location being adjacent the aperture.

17. An apparatus as set forth in claim 16 wherein the second mounting location is adjacent the back end of the sleeve assembly.

18. A disk cartridge storage and retrieval system comprising;

a carriage for transporting an optical disk cartridge between a plurality of locations, moving means fixed to the carriage for moving the disk cartridge contained in the carriage, a motor positioned on the carriage for driving the moving means, coupling means for coupling the motor to the moving means whereby the motor can drive the moving means to move the disk cartridge, a spring coupled between the motor and the carriage positioned so as to exert a force between the carriage and the motor opposite to a force exerted between the moving means and the motor by the coupling means tension at a time prior to said motor being fixedly mounted to said carriage so as to create a predetermined tension in the coupling means, the spring having a length and a spring constant adapted such that the force is within a predetermined range when the motor is positioned within a predetermined range of positions, and means for fixedly mounting the motor to the carriage in a position dictated by the spring force and the belt tension.

19. An apparatus as set forth in claim 18 further comprising;

a worm screw extending in a first direction, a shaft substantially parallel to the worm screw, the carriage being slidingly engaged to the shaft by a bushing, a nut assembly engaging the worm screw such that rotation of the worm screw drives the nut assembly to travel along the worm screw, and a flexure coupled between the nut assembly and the carriage, the flexure providing for planar movement in the first direction, but substantially no rotational movement, between the nut assembly and the carriage.

20. An apparatus as set forth in claim 19 further comprising a plurality of disk cartridges in storage locations, wherein the moving means comprises a sleeve assembly for temporarily storing one of the disk cartridges for transportation, the sleeve assembly comprising a sleeve adapted to store a disk cartridge, the sleeve including a front end having an aperture for receiving a disk cartridge and a back end opposite the front end, and wherein the carriage is moveable to precisely position the sleeve with the aperture adjacent a storage location so that a disk cartridge can be drawn from the storage location into the sleeve through the aperture, the sleeve being rotatably mounted to the carriage at first and second mounting locations, the first mounting location being adjacent the aperture.

21. An apparatus as set forth in claim 20 wherein the second mounting location is adjacent the back end of the sleeve assembly.

* * * * *